Figure 1:
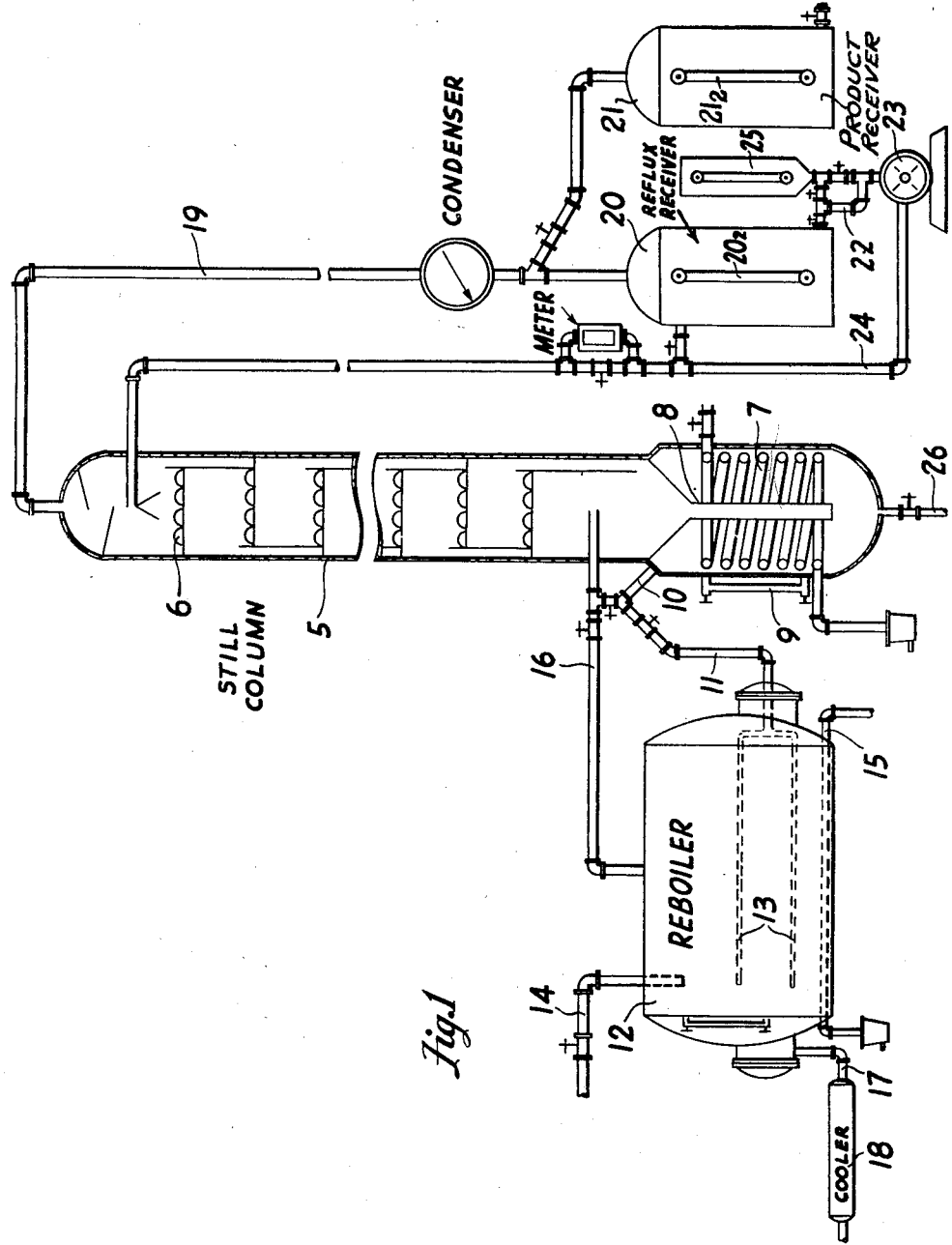

Feb. 20, 1951 W. F. FULTON 2,542,187
METHOD OF SEPARATING SELECTED CONSTITUENTS FROM GASES
Filed Aug. 25, 1947 2 Sheets-Sheet 1

WILLIAM F. FULTON
INVENTOR
BY J. Vincent Martin
Ralph R. Browning
James O. Simms
ATTORNEYS Feb. 20, 1951  W. F. FULTON  2,542,187
METHOD OF SEPARATING SELECTED CONSTITUENTS FROM GASES
Filed Aug. 25, 1947  2 Sheets-Sheet 2

WILLIAM F. FULTON
INVENTOR

Patented Feb. 20, 1951

2,542,187

UNITED STATES PATENT OFFICE 2,542,187

METHOD OF SEPARATING SELECTED CONSTITUENTS FROM GASES

William F. Fulton, Bellaire, Tex., assignor to Warren Petroleum Corporation, Houston, Tex., a corporation of Delaware Application August 25, 1947, Serial No. 770,441

3 Claims. (Cl. 202—40)

This invention relates to improvements in methods of separating selected constituents from gaseous mediums and refers more particularly to separation methods wherein the gaseous medium is contacted with a liquid which has a selective afinity for one or more of the constituents of the gaseous medium as compared with the remainder of the constituents thereof.

The improved methods of this invention are useful, for example, in distillation and absorption processes. In a distillation process the reflux liquid is treated in accordance with this invention to increase its capacity for dissolving the constituent or constituents of the gaseous medium which remain as a still bottom or are to be withdrawn from the still as a liquid at some intermediate point of a still column. In an absorption process, the absorbent menstruum is treated in accordance with this invention whereby its efficiency as a stripping liquid is materially increased.

In all separation methods, one of the major problems is to increase the efficiency at which the separation may be carried out. For example, in distillation processes the heat input requirement is an important factor influencing efficiency. The efficiency of an absorption process may be increased by a reduction of the ratio of the absorbent menstruum to gaseous medium treated, with the resultant lowering of the energy requirement for circulation and rectification of the menstruum in the cycle.

An object of this invention is to increase the rate of absorption of selected constituent or constituents from a gaseous medium by a stripping liquid.

Another object is to provide a distillation process wherein the heat requirement for a given separation problem may be materially reduced.

A further object is to provide a distillation process wherein the stripping of a gaseous medium of selected constituents by reflux liquid may be efficiently accomplished.

Still another object is to provide an efficient absorption process for the separation of selected constituents from a gaseous medium.

A still further object is to provide an improved absorption process wherein the ratio of absorbent menstruum to feed stock may be reduced.

Other and further objects of this invention will appear from the following description.

In general, this invention involves the incorporation into a stripping liquid, which will be used to separate selected constituents from a gaseous medium, of a polar polyethylene compound which forms a non-ideal solution with the stripping medium. This stripping medium is preferably caused to flow counter currently with the gaseous medium treated. In a distillation process carried out in accordance with this invention, the treating compound may be added to the reflux liquid which then serves as a stripping liquid. On the other hand, in an absorption process the treating compound is mixed with the absorbent menstruum.

Applicant is unable to advance a satisfactory explanation for the improved results obtained by carrying out a separation in accordance with this invention. However, by experimentation it has been found that such improved results are obtainable and this constitutes the basis of this invention.

Referring now to the treating compound, it has been found essential that the compound have a polarity and be of the type which forms a non-ideal solution in the stripping medium. Such a solution is well recognized by those skilled in the art, although the theory of such solution is not too well understood. Polyethylene compounds of a polar character have been found to be entirely satisfactory for this purpose. The polyethylene compound may be an ester of a relatively low molecular weight paraffin with a relatively long chain fatty acid. In this instance, the carboxyl group has been found to provide sufficient polarity to the ester for this purpose. However, it is preferable that the molecule have added polarity which may be derived from the presence of either an OH group or NH2 group substituted on the paraffin radical. Such compounds may be, for instance, polyethylene glycol esters of a long chain aliphatic acid.

Illustrative compounds that have been found suitable for the purposes of this invention for a separation of, for example, N-heptane and methylcyclohexane, are:

Butyl oleate
Butyl stearate
Dibutyl tartrate
Hexylene glycol
Glyceryl oleate edible
Tetraethylene pentamine
Glyceryl mono laurate
Glaurin
Diglycol oleate Of these compounds, glaurin is preferred for this separation because of its effectiveness and also its stability under temperature conditions encountered in the distillation of these two products. At a later point in this specification, data will be given to illustrate the relative effectiveness of each of these compounds in performing this separation. Glaurin has also been found to be the preferred compound for use in the separation of benzene and carbon tetrachloride.

Figure 3:
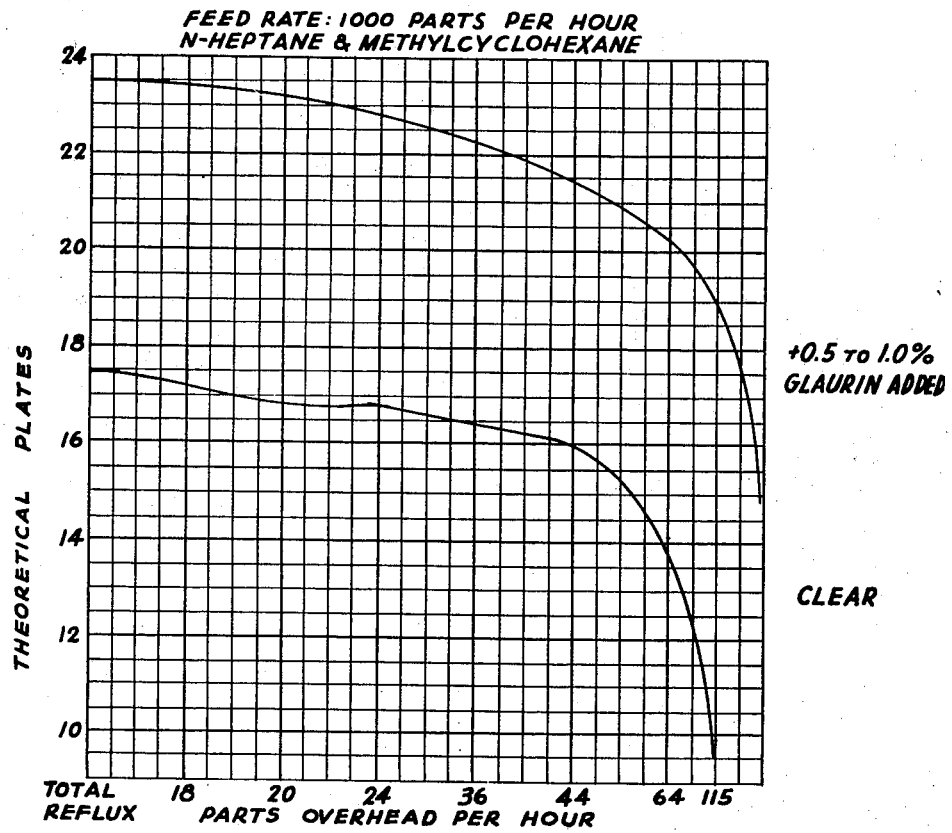
Figure 2:
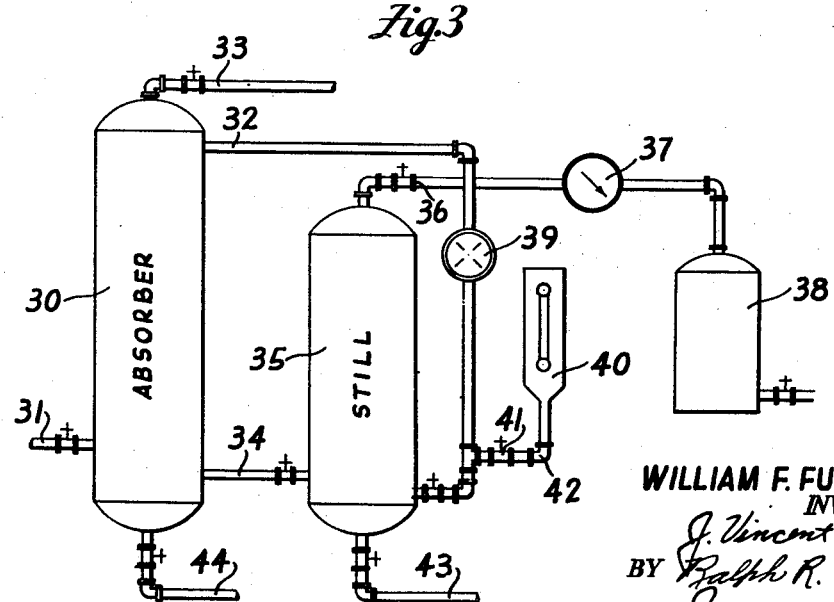

It is believed that reference to the accompanying drawings will facilitate an understanding of the invention. In the drawings which form a part of the instant specification and are to be read in conjunction therewith and wherein like reference numerals are employed to indicate like parts in the various views:

Fig. 1 is a flow sheet illustrating diagrammatically distillation apparatus usable in accordance with this invention, Fig. 2 is a schematic drawing of apparatus usable in conjunction with this invention in carrying out an absorption process, and Fig. 3 is a graph illustrating the increased efficiency derived in separation methods carried out in accordance with this invention.

Referring to Fig. 1 of the drawings, the column 5 is a distillation column equipped interiorly with conventional bubble trays 6. At the lower end of the column is a steam coil or other heater 7 surrounding a funnel-like tubular member 8. Liquid reflux from column 5 accumulates in the bottom of the column and the funnel 8 serves as a trap as the liquid level, in operation, rises above the lower opening of the funnel. A gauge 9 is provided to indicate the level of the accumulated reflux liquid in the bottom of the tower. The heater 7 causes vaporization of the reflux except for the special treating compound. The vapors pass overhead through valve controlled connections 10 and 11 into reboiler 12. Vapors are distributed uniformly interiorly of the reboiler through perforated pipes 13. Feed stock is introduced into the system through valved control pipe 14 leading into the reboiler.

A steam coil or other heater 15 in the reboiler causes evaporation of the liquid within the reboiler, the vapors passing into tower 5 beneath the lowermost bubble tray through valved connection 16. The heavier bottoms are withdrawn from the reboiler through line 17 and pass through bottoms cooler 18 to a suitable storage tank or the like not shown in the drawings. It will be apparent that vapors from the bottom of tower 5 may be introduced directly into line 16 and into the upper part of the tower 5.

The overhead product from tower 5 is conveyed through line 19 into separate receivers 20 and 21. The receiver 21 is for accumulation of overhead product while the receiver 20 is a reflux accumulator. Gauges 21a and 20a indicate the level of liquid within each of the receivers, respectively.

The reflux liquid from receiver 20 is circulated through valved connection 22, pump 23, and metered connection 24 into the upper portion of tower 5 where it is discharged in a manner to flow downwardly through the bubble trays counter-currently to the gaseous medium rising through the column. A treating compound selected in accordance with the principals of this invention is carried in reservoir 25 and is charged into the reflux liquid as it is circulated from the reflux receiver to the upper end of tower 5. A very small percentage of compound is required and it has been found from .5% to 8% of the treating compound is usually sufficient to materially increase the efficiency of the distillation process. The treating compound is separated from the reflux liquid in the bottom of tower 5. This separation is readily effected due to the substantially higher boiling point of the treating compound as compared to the reflux liquid. The treating compound may be withdrawn from the bottom of tower 5 through connection 26 and may be conducted by pipes not shown in the drawing to reservoir 25 to recharge the reservoir.

The operation of the apparatus of Fig. 1 is believed apparent from the foregoing description. The reboiler serves in effect as an additional plate in the distillation column and, together with the funnel-like pipe 8 and heater 7 in the bottom of tower 5, provides a means for separating the reflux liquid from the treating compound.

The treating compound is incorporated within the reflux liquid as the liquid is circulated from receiver 20 from the upper portion of the tower. Thus, the treated reflux liquid serves as a stripping medium in passing counter-currently to the distillation gases or vapors and effectively strips the higher boiling fraction of the vapors from the lower boiling fraction as it passes downwardly through column 5.

The effectiveness of the separation method of this invention is illustrated by the data reproduced below, obtained in conducting a standard test in an Oldershaw column. The following data was obtained when testing a mixture of N-heptane and methylcyclohexane. The feed rate in the column was held constant at 1 thousand parts per hour during all of the tests.

| Compound Added | Approximate Added in percent | Theoretical Plates at Total Reflux |
|---|---|---|
| Butyl Oleate | 1-2 | 21.6 |
| Butyl Stearate | 1 | 20.1 |
| Dibutyl Tartrate | 4 | Flooded |
| Do | 1 | 21.6 |
| Hexylene Glycol | 2 | 20.7 |
| Do | 4 | 20.7 |
| Do | 8 | 23.5 |
| Glyceryl Oleate Edible | 1 | 19.2 |
| Oleic Acid | 2 | 18.7 |
| Do | 1 | 18.7 |
| Aniline | 2 | 15.1 |
| Do | 8 | 15.1 |
| Tetraethylene Pentamine | 0.5-1 | 23.4 |
| Do | 0.5-1 | 23.4 |
| Glyceryl Mono Laurate | 1 | 23.9 |
| Glaurin | 1 | 23.5 |
| Diglycol Oleate | 1 | 23.5 |
| Check runs on Mixture of N-Heptane and Methylcyclohexane. | Clear | 17.3 |
| | Clear | 17.8 |
| | Clear | 17.1 |

From the above data, it will be seen that at total reflux the theoretical plate value has been increased from an average of approximately 17.5 for the untreated mixture of N-heptane and methylcyclohexane to as high as 23.9 plates where glyceryl mono laurate is used. As little as a .5% of tetraethylene pentamine was affected to raise the theoretical plate value to 23.4. The addition of 1% glaurin (diethylene glycol mono laurate) was effective to raise the theoretical plate value to 23.5. This compound is preferred because of its high stability under the temperature and pressure conditions encountered in this distillation process.

It is considered noteworthy that as much as 2% of oleic acid did not increase the plate efficiency of the column sufficiently to have any practical effect thereon. Also significant is the negative effect noted for aniline even when used in quantities as great as 8%. However, when a polyethylene polar compound forming a non-ideal solution with the reflux liquid was used, in every instance beneficial results were obtained.

The best results were obtained by using an ester formed between a low molecular weight paraffin and a long chain fatty acid wherein the molecule had added polarity due to the presence of either an OH or NH₂ group substituted on the low molecular weight paraffin radical.

Further tests were conducted in an Oldershaw column, the results of which are plotted in the graph of Fig. 3 of the drawings. It will be seen that at total reflux the untreated mixture of N-heptane and methylcyclohexane had in an Oldershaw column a total theoretical plate value of 17.5. As the amount of overhead product withdrawn is increased, the efficiency of the distillation process gradually decreases until approximately 44 parts or 4.4% of the overhead is withdrawn. As the overhead withdrawal is increased past this point, the theoretical plate value drops sharply. When glaurin is added in amounts ranging from .5% to 1% to the reflux the theoretical plate value at total reflux increases to 23.5 as shown by the upper curve. As the amount of overhead withdrawal increases, the theoretical plate value drops. However, even with 115 parts or 11.5% of the overhead withdrawn per hour, the theoretical plate value is at 19 which is 1½ greater than the plate value at total reflux for the untreated mixture.

It was found in conducting these experiments upon which the graph is based that an increase in the rate of boiling over of the mixture in the still, at total reflux, increased the theoretical plate value. When the rate of boiling was increased from 1000 parts per hour to 3000 parts per hour, the theoretical plate value of the clear mixture was increased from 17.5 to 20.1. However, with .5% to 1% of glaurin added to the mixture the theoretical plate value at 1000 parts per hour was 23.5 which is greater than that obtained from the clear mixture at three times the boiling rate. This, of course, means that greater efficiency of separation may be had in the distillation process of this invention even though the heat input may be maintained at substantially one-third that required in carrying out the distillation under conventional methods.

Additional tests conducted in the separation of benzene and carbon tetrachloride bear out the conclustions reached above. At a feed or boiling rate of 1500 parts per hour the clear mixture at total reflux had a theoretical plate value at 21.8. This value was increased by stepping up the feed or boiling rate to 3000 parts per hour to 22.8. However, when .5% to 1% glaurin was added, the theoretical plate value was increased to 24.9 at a feed rate of 1500 parts per hour and remained the same when the feed rate was increased to 3000 parts per hour. Thus, the distillation process is much more efficient when the treating compound has been added for the boiling rate may be materially reduced to save heat energy without sacrifice as to the degree of stripping of the desirable constituents from the still vapors.

Referring to the absorption equipment shown in Fig. 2 of the drawings, the absorption tower 30 is shown as a conventional tower with a valve controlled inlet 31 for introducing feed vapors into the bottom of the tower. The feed vapors may constitute, for example, a natural gas including methane, ethane, propane, butane, pentane, and the like, or any other mixture of light hydrocarbons. The vapors pass upwardly through the tower in counter current flow relationship with the adsorbent menstruum which is introduced into the upper portion of the tower through connection 32. The light fraction or residue gas passes from the tower as an overhead product through valve controlled line 33 and is disposed of in a manner not shown in the drawings.

The rich oil is withdrawn from the bottom of the absorber through valve controlled line 34 and is introduced into the bottom of still 35. The heater for the still is not shown in the drawing in the interest of simplicity but is effective to release the heavier hydrocarbon constituents that have been absorbed by the oil in passing through the absorber tower 30. These constituents pass from the still through overhead line 36 and condenser 37 and into a product tank 38. The stripped oil which constitutes a rectified or lean absorbent menstruum is circulated by pump 39 from the bottom of the still to the upper portion of the absorption tower.

A treating compound reservoir 40 is provided for introducing the treating compound of this invention into the absorbent menstruum as it leaves the still. Once sufficient treating compound has been incorporated into the absorbent menstruum, additional increments need to be added only intermittently as new absorbent menstruum is added, as this compound is not separated from the absorbent menstruum during the cycle. Additional amounts of the compound may be introduced into the menstruum as required by manipulation of valve 41 controlling the connection 42 between the reservoir and the conduit carrying the absorbent menstruum.

The connections 43 and 44 are provided for the bottoms of the still and absorption tower respectively in order to withdraw tars or heavy bottoms therefrom.

In operation, the absorption separation may be carried out in accordance with conventional practice except for the incorporation into the absorbent menstruum of a small percentage of a polar poleythylene compound which forms a non-ideal solution with a menstruum. Usually, it is found that percentages ranging from .5% to 8% of the compound is sufficient to give satisfactory results. As in the case of separation by distillation, the effectiveness of the compound is greater when the compound is in the form of an ester of a low molecular weight paraffin and a long chain fatty acid in which the paraffin radical has substituted thereon groups selected from OH and NH₂ in order to add polarity to the molecule.

The effectiveness of these compounds in absorption separations is illustrated by the results obtained in tests made in an Oldershaw column. A dry natural gas saturated at 32° F. with carbon tetrachloride was passed through the column counter-currently to a 39 gravity absorption menstruum. The overhead from the column was ignited in the presence of copper a green tint to the flame indicated the presence of carbon tetrachloride in the overhead product. It was found that the green tint was eliminated by use of a sufficiently high ratio of menstruum to feed stock. However, the green color disappeared when the menstruum contained glaurin thoroughly mixed therewith in an amount between .5% to 8% when the ratio of menstruum to feed stock was only approximately one-third that obtained with the untreated menstruum. This clearly illustrates the increased efficiency of the absorption operation occasioned by a saving in the energy required for circulating the mentruum as well as the energy required in the rectification step.

It is to be understood that the terms "gas," "gaseous medium," "or the like," are used broadly in this specification and appended claims and refer to any gas whether saturated or not and thus are intended to include mediums sometimes referred to as vapors.

It will be seen that the objects of the invention have been accomplished. There has been provided a method of separating desirable constituents from a gaseous medium wherein the efficiency of conventional separation methods is materially increased. The presence in the stripping liquid of a small percentage of a polar polyethylene compound of a type which will form an ideal type with the stripping liquid reduces the amount of stripping liquid required in the separation step with resultant increase in efficiency of operation.

From the foregoing it will be seen that this invention is one well adapted to attain all of the ends and objects hereinabove set forth together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described the invention, what is claimed is:

1. In a process of separating selected constituents from a gaseous medium wherein the medium is contacted with a hydrocarbon stripping liquid, the improvement which resides in the use of a hydrocarbon stripping liquid having incorporated therein from .5% to 8% of glaurin.

2. In a process of distillation wherein the distillation vapors are contacted with hydrocarbon liquid reflux, the improvement which resides in the combination therewith of the step of incorporating in the hydrocarbon reflux, prior to contacting the vapors therewith, from .5% to 8% of glaurin which forms a non-ideal solution with the stripping liquid.

3. In a process of distillation wherein the distillation vapors are contacted with a hydrocarbon liquid reflux, the improvement which resides in the combination therewith of the step of incorporating in the hydrocarbon reflux, prior to contacting the vapors therewith, from .5% to 8% of glaurin.

WILLIAM F. FULTON.

REFERENCES CITED

The following references are of record in the file of this patent:

UNITED STATES PATENTS

| Number | Name | Date |
|---|---|---|
| 1,474,216 | Van Ruymbeke | Nov. 13, 1923 |
| 2,081,189 | Wiezevich | May 23, 1937 |
| 2,179,991 | Bright | Nov. 14, 1939 |
| 2,231,026 | Quattlebaum | Feb. 11, 1941 |
| 2,290,636 | Deanesly | July 21, 1942 |
| 2,360,655 | Deanesly | Oct. 17, 1944 |
| 2,368,597 | Morris et al. | Jan. 30, 1945 |
| 2,375,036 | Pierotti et al. | May 1, 1945 |
| 2,379,268 | Zimmer | June 26, 1945 |
| 2,413,205 | Word et al. | Dec. 24, 1946 |
| 2,433,060 | Ohsol et al. | Dec. 23, 1947 |